United States Patent
Ikeno et al.

(10) Patent No.: US 6,862,058 B2
(45) Date of Patent: Mar. 1, 2005

(54) TRANSFLECTIVE LIQUID CRYSTAL DEVICE WITH DIFFERENT ALIGNMENT MODES OF LIQUID CRYSTAL MOLECULES

(75) Inventors: Hidenori Ikeno, Tokyo (JP); Masayoshi Suzuki, Tokyo (JP)

(73) Assignee: NEC LCD Technologies, Ltd., Kawasaki (JP)

( * ) Notice: Subject to any disclaimer, the term of this patent is extended or adjusted under 35 U.S.C. 154(b) by 22 days.

(21) Appl. No.: 10/224,279

(22) Filed: Aug. 21, 2002

(65) Prior Publication Data

US 2003/0038909 A1 Feb. 27, 2003

(30) Foreign Application Priority Data

Aug. 22, 2001 (JP) .................................... 2001-251089

(51) Int. Cl.[7] .................. G02F 1/136; G02F 1/1333; G02F 1/1335
(52) U.S. Cl. .................. 349/114; 349/43; 349/106; 349/113
(58) Field of Search .................. 349/113, 106, 349/43, 114

(56) References Cited

U.S. PATENT DOCUMENTS

| | | | |
|---|---|---|---|
| 5,909,265 A | | 6/1999 | Kim et al. |
| 5,982,464 A | | 11/1999 | Wang et al. |
| 6,195,140 B1 | * | 2/2001 | Kubo et al. |
| 6,226,061 B1 | | 5/2001 | Tagusa |
| 6,295,108 B1 | | 9/2001 | Kaneko |
| 6,295,109 B1 | | 9/2001 | Kubo et al. |
| 6,341,002 B1 | | 1/2002 | Shimizu et al. |
| 6,466,280 B1 | * | 10/2002 | Park et al. ..................... 349/43 |
| 6,476,889 B2 | * | 11/2002 | Urabe et al. ................. 349/106 |
| 6,570,634 B2 | * | 5/2003 | Kim ........................... 349/107 |
| 2002/0033918 A1 | * | 3/2002 | Shigeno et al. ............. 349/114 |

FOREIGN PATENT DOCUMENTS

| | | |
|---|---|---|
| EP | 0 996 027 A1 | 4/2000 |
| EP | 0 996 028 A2 | 4/2000 |
| EP | 1 122 585 A1 | 8/2001 |
| JP | 11-84371 | 3/1999 |
| JP | 11-101992 | * 4/1999 |
| JP | 2000-47194 | 2/2000 |
| JP | 2000-187220 | 7/2000 |
| KR | 1999-0063559 | 7/1999 |

OTHER PUBLICATIONS

Korean Office Action dated Aug. 21, 2004 (with partial translation).

* cited by examiner

Primary Examiner—Huyen Ngo
(74) Attorney, Agent, or Firm—McGinn & Gibb, PLLC

(57) ABSTRACT

A liquid crystal display (LCD) device comprises a first substrate including a thin film transistor (TFT), a second substrate, and a liquid crystal (LC) layer of liquid crystal molecules. The LC layer is interposed by the first and second substrates. The first substrate includes a reflective electrode in a reflective region and a transmissive electrode in a transmissive region. The LC layer includes a first group of liquid crystal molecules aligned in the reflective region to provide a first retardation and a second group of liquid crystal molecules aligned in the transmissive region to provide a second retardation. The second retardation is different from the first retardation.

21 Claims, 15 Drawing Sheets

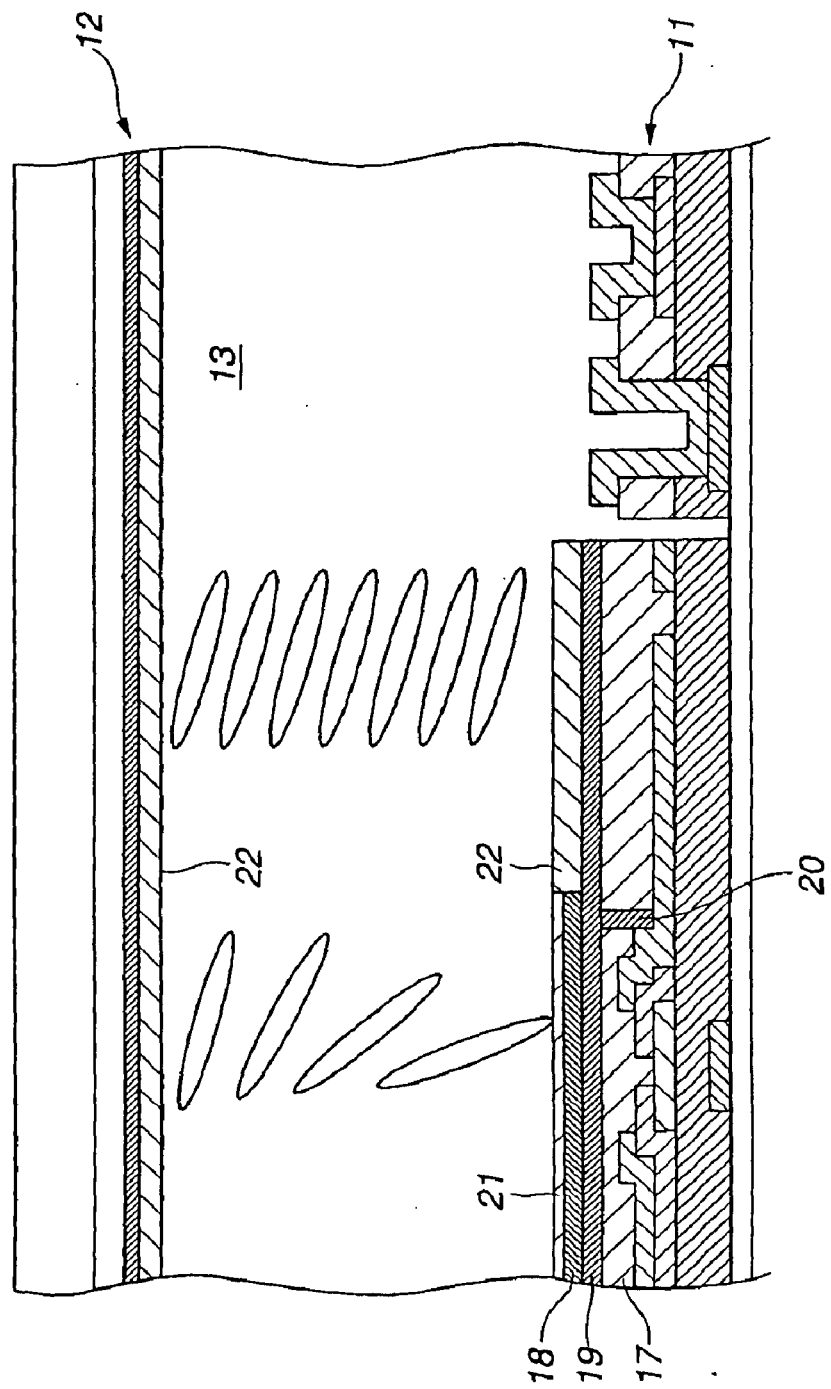

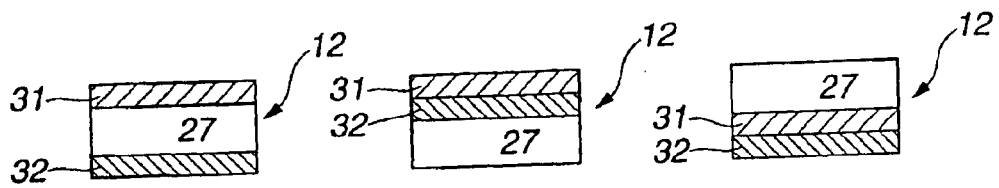
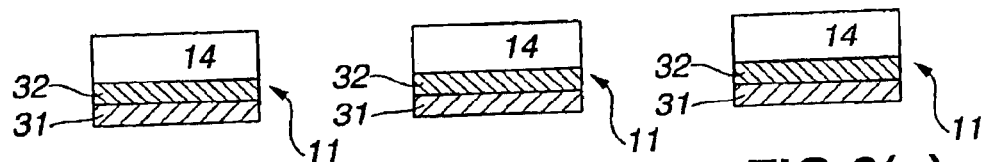
FIG.9(a) FIG.9(b) FIG.9(c)
FIG.9(d) FIG.9(e) FIG.9(f)
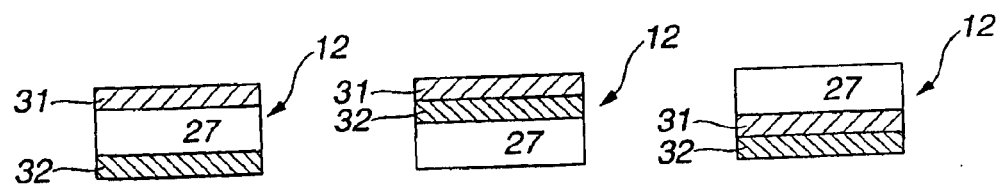
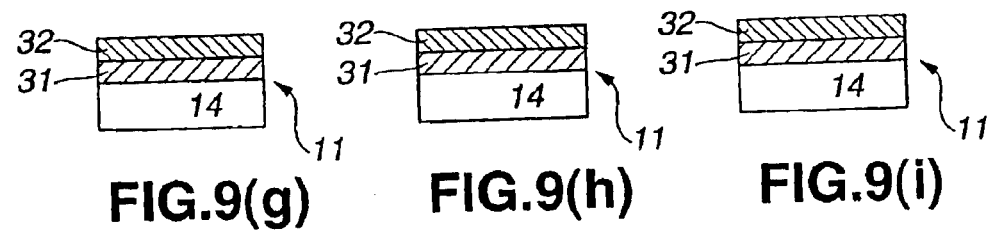
FIG.9(g) FIG.9(h) FIG.9(i)

TRANSFLECTIVE LIQUID CRYSTAL DEVICE WITH DIFFERENT ALIGNMENT MODES OF LIQUID CRYSTAL MOLECULES

BACKGROUND OF THE INVENTION

1. Field of the Invention

The present invention relates to liquid crystal display (LCD) devices and more particularly to transflective LCD devices, which use the reflected and transmitted brightness.

2. Description of the Related Art

Reflective LCD devices use the reflected brightness from room light, while transmissive LCD devices use the transmitted brightness from an internal light source, such as a backlight.

The reflective LCD devices, which are used as display devices of portable information terminals, are advantageous over the transmissive LCD devices, in power consumption, thickness and weight. Such advantages derive mainly from the elimination of a backlight. However, the transmissive LCD devices are advantageous in visibility in dark environment.

Commonly, the LCD devices include a layer of liquid crystal (LC) molecules. Examples of modes are a twisted nematic (TN) mode, a single polarizing plate mode, a super twisted nematic (STN) mode, a guest host (GH) mode, a polymer dispersed liquid crystal (PDLC) mode, and a cholesteric mode. A switching element is provided per pixel to drive the liquid crystal layer. A reflector or a backlight is provided within or outside of the LC cell. To produce fine and high visibility in image, the LCD devices employ an active matrix drive system, in which switching elements, such as, thin film transistors (TFTs) or metal/insulator/metal (MIM) diodes, are attached to each pixel to switch one "on" or "off". In such LCD devices, a reflector or a backlight accompanies the active matrix drive system.

One example of known transflective LCD devices is illustrated in FIGS. 14 and 15. The same transflective LCD device is found in Kubo et al. (U.S. Pat. No. 6,195,140 B1 issued Feb. 27, 2001) and JP 2955277 B2. Kubo et al. illustrates the same structure in FIGS. 1 and 29 and provides a description on FIG. 1 from line 49 of column 8 to line 11 of column 11 and a description on FIG. 29 in lines 53 to 63 of column 27. JP 2955277 B2 illustrates the same structure in FIGS. 1 and 10. Both JP 2955277 B2 and Kubo et al. claim priority based on JP patent application No. 9-201176 filed Jul. 28, 1997.

FIG. 14 is a plan view of one pixel portion of an active matrix substrate, illustrating gate lines 4 and source lines 5 that are disposed along the peripheries of pixel electrodes 3 and cross each other at right angles. TFTs 6 are formed in the vicinity of the respective crossings of the gate and source lines 4 and 5. A gate electrode and a source electrode of each TFT 6 are connected to the corresponding one gate line 4 and the corresponding one source line 5, respectively. Each of the pixel electrodes 3 includes a reflective region 7 formed of a metal film and a transmissive region 8 formed of indium/tin oxide (ITO).

In the reflective mode, the room light passes through the LC layer to the reflective regions 7 of the pixel electrodes 3. At the reflective regions 7, this light is reflected and returns through the LC layer to a viewer. In the transmissive mode, the light from a backlight passes though the transmissive regions 8 of the pixel electrodes 3 and the LC layer to the viewer.

In the reflective regions 7, the room light and the returned light pass through the LC layer in the opposite directions before reaching the viewer. In the transmissive regions 8, the light from the backlight passes through the LC layer once before reaching the viewer. When both reflective and transmissive modes are used simultaneously, the difference in optical path makes it difficult to optimize the output, such as brightness and contrast. One approach to this problem is found in the structure shown in FIG. 15. According to this structure, the thickness of the LC layer dr in the reflective regions 7 is different from the thickness of the LC layer df in the transmissive region 8. In the reflective regions 7, the thickness dr is adjusted by adjusting the thickness of an insulating layer 17, which lies between a transmissive electrode 19 and on a reflective electrode 1. In FIG. 15, the reference numeral 25 indicates a counter electrode.

To eliminate the difference in optical path, the setting is such that the ratio between the thickness dr and the thickness df is about 1:2. This requires that the insulating layer 17 be thick almost as much as half the thickness of the LC layer. Thus, in the reflective regions 7, the insulating layer 17 with several micron meters thick is required, resulting in an increased fabrication processes. Besides, the provision of such insulating layer 17 in each reflective region 7 prevents the overlying transmissive electrode 19 from having surface flatness. The surface of the transmissive electrode 19 is coated with material to form an alignment film. The surface of the alignment film is not flat. With such alignment film, robbing method may not provide a degree of alignment of LC molecules as high as expected.

An object of the present invention is to provide a liquid crystal device in which the difference in optical path between the reflective mode and transmissive mode is reduced with the plane surface of a substrate kept.

SUMMARY OF THE INVENTION

According to one exemplary implementation of the present invention, a liquid crystal display (LCD) device comprises a first substrate including a thin film transistor (TFT), a second substrate, and a liquid crystal (LC) layer of liquid crystal molecules. The LC layer is interposed by the first and second substrates. The first substrate includes a reflective electrode in a reflective region and a transmissive electrode in a transmissive region. The LC layer includes a first group of liquid crystal molecules aligned in the reflective region to provide a first retardation and a second group of liquid crystal molecules aligned in the transmissive region to provide a second retardation. The second retardation is different from the first retardation.

BRIEF DESCRIPTION OF THE DRAWINGS

The foregoing and other objects, features and advantages of the invention will be apparent from the following more particular description of exemplary implementations of the invention as illustrated in the accompanying drawings. The drawings are not necessarily scale, emphasis instead being placed upon illustrating the principles of the invention.

FIG. 3 is a similar view to FIG. 1 illustrating different alignment modes of LC molecules in the first implementation, one within each of reflective regions and the other within each of transmissive regions.

FIGS. 9(a) to 9(i) are oversimplified views illustrating other possible arrangements of polarizers and quarter-wave plates.

DESCRIPTION OF THE EXEMPLARY IMPLEMENTATIONS

Figure 1:
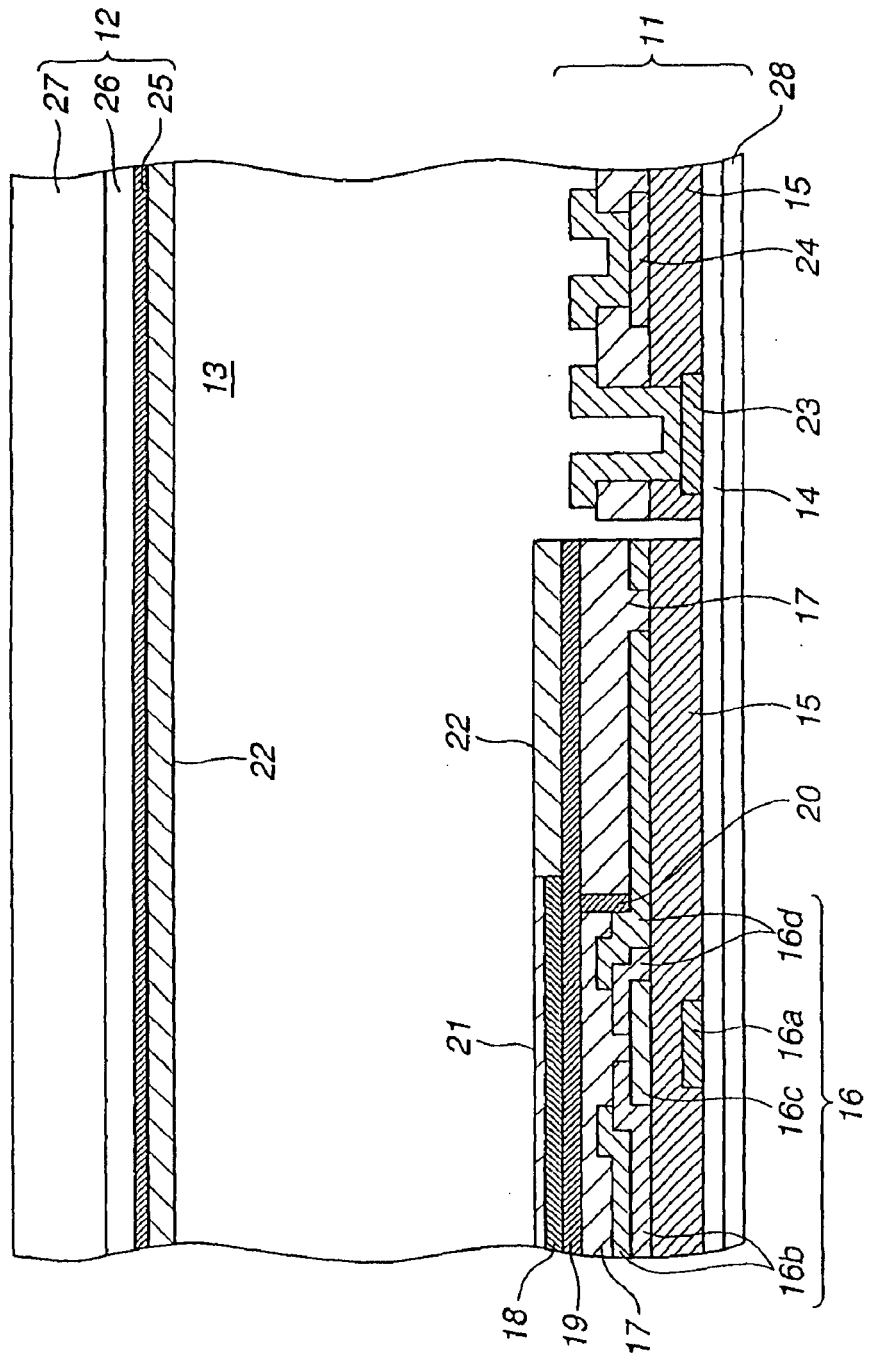
FIG. 1 is a sectional view of one pixel portion of a transflective LCD device, illustrating a first exemplary implementation of the present invention.

Referring to the accompanying drawings, the same reference numerals are used to designate same or similar parts or portions throughout each view of FIGS. 1 to 13 for the sake of brevity of description.

First Implementation of the Invention

With reference to FIGS. 1 to 3, the first implementation of a transflective LCD device of the invention is described.

As shown in FIG. 1, this LCD device includes, within the device, a lower side (or TFT) substrate 11, a counter substrate 12, and a LC layer 13 interposed between the substrates 11 and 12. The LCD device employs an active matrix drive system, in which switching elements, such as, TFTs or MIM diodes, are attached to each pixel.

Within one pixel portion illustrated in FIG. 1, the lower side substrate 11 includes an insulating substrate 14, a protective insulating film 15, a TFT 16, an insulating layer 17, a reflective electrode 18, and a transmissive electrode 19. The substrate 14 is coated with the protective film 15. Formed on the protective film 15 is the TFT 16. The TFT 16 includes a gate electrode 16a formed on the substrate 14, a drain electrode 16b formed on the protective film 15, a semiconductor layer 16c, and a source electrode 16d. The protective film 15 covers the gate electrode 16a and provides insulation from the drain electrode 16b.

The insulating layer 17 covers the TFT 16. The insulating layer 17 is formed with a contact hole 20 exposing a surface portion of the underlying source electrode 16d. The transmissive electrode 19 is formed over the insulating layer 17.

A reflective electrode 18 is formed over a surface portion of the transmissive electrode 19. The reflective electrode 18 is connected to the transmissive electrode 19, which in turn is connected via the contact hole 20 to the source electrode 16d. The reflective electrode 18 and the transmissive electrode 19 are a pixel electrode.

Material, such as polyimide, covers the reflective and transmissive electrodes 18 and 19 to deposit an alignment film. The alignment film is dividable into and consists of a vertical alignment film portion 21 and a horizontal alignment film portion 22. Within a reflective mode region, the vertical alignment film 21 coextends with the reflective electrode 18. Within a transmissive mode region, the horizontal alignment film 22 coextends with the exposed surface portion of the transmissive electrode 19. Another alignment film covers the surface of the counter substrate 12, which faces the LC layer 13. In this implementation, the mode of alignment of LC molecules within the reflective mode region including the reflective electrode 18 is a HAN alignment mode. The mode of alignment of LC molecules within the transmissive mode region including the exposed transmissive electrode 19 is a homogeneous alignment mode or a TN alignment mode.

Within a terminal region on the peripheral portions of the lower side substrate 11, a gate terminal 23 is formed on the insulating substrate 14, and a drain terminal 24 is formed on the protective insulating film 15.

Viewing from the nearest side to the LC layer 13, the counter substrate 12 includes a counter electrode 25, a color filter 26, and an insulating substrate 27, which are formed one on another in this order. The incident light to the insulating substrate 27 of the counter substrate 12 passes through the LC layer 13 to the reflective region of each pixel. At the reflective region, this light is reflected by the reflective electrode 18 and returns through the LC layer 13, counter electrode 25 and counter substrate 12 to a viewer.

A backlight 28 is attached to the remote side of the underside substrate 11 from the LC layer 13. The light from the backlight 28 passes though the substrate 14, protective film 15, insulating layer 17 and transmissive electrode 19 of the transmissive region of each pixel to the LC layer 13, and this light passes through the LC layer 13, transmissive electrode 25 and counter substrate 12 to the viewer.

With reference to the fabrication steps illustrated in FIGS. 2(a) to 2(f), the first implementation of the invention is further described.

Figure 2A:
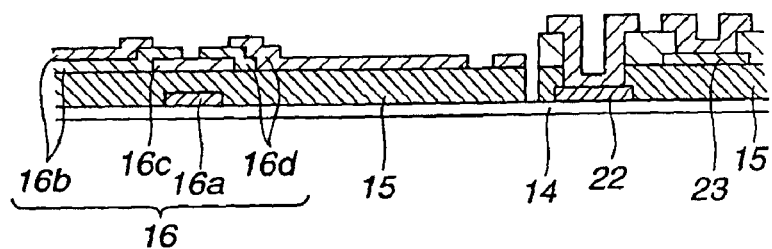
FIGS. 2(a) to 2(f) are views illustrating fabrication steps for the first implementation.

Referring to FIG. 2(a), a TFT 16 is completed by forming a gate electrode 16a on an insulating substrate 14, coating the gate electrode 16a and insulating substrate 14 with a protective insulating film 15, and forming a drain electrode 16b, a semiconductor layer 16c, and a source electrode 16d on the protective film 15.

Figure 2B:
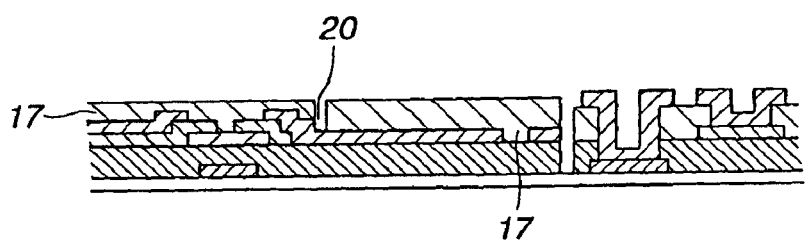

Referring to FIG. 2(b), the TFT 16 is covered with an insulating layer 17. The insulating layer 17 is formed with a contact hole 20 reaching the underlying source electrode 16d. "While the above exemplary implementation describes modes of alignment, a liquid crystal display device in accordance with the present invention may, without limitation, include liquid crystal molecules that are aligned in at least one mode selected from a homogeneous alignment mode, a homeotropic alignment mode, a twisted-nematic alignment mode, a hybrid aligned nematic alignment mode, and an optically controlled birefrigence alignment mode."It is to be noted that the TFT 16 is one of various examples of a switching element, which may be used in an active matrix drive system. Another example of the switching element is a MIM diode.

Figure 2C:
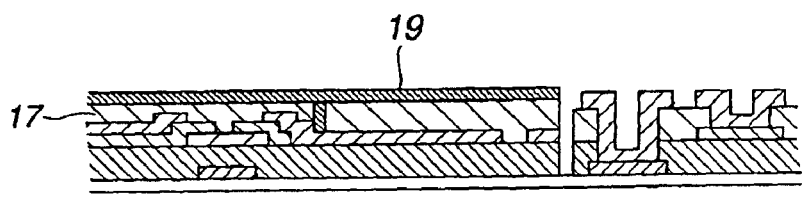

Referring to FIG. 2(c), a transmissive electrode 19 of ITO is formed over the insulating layer 17. The material of the transmissive electrode 19 fills the contact hole 20 to establish electrical connection between the transmissive electrode 19 and the source electrode 16d.

Figure 2D:
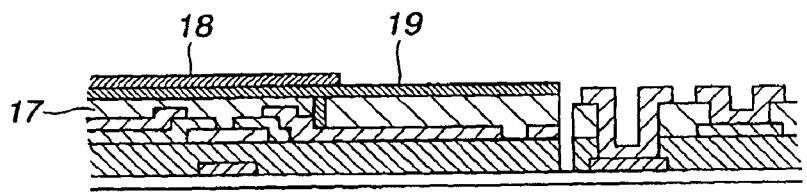

Referring to FIG. 2(d), with a portion being masked, a film of an electrically conductive material such as aluminum (Al) is formed over the unmasked portion of the transmissive electrode 19 to form a reflective electrode 18. Another method is to form an electrically conductive film over the whole surface area of the transmissive electrode 19. With a portion being masked, the electrically conductive material within the unmasked portion may be removed by etching.

Figure 2E:
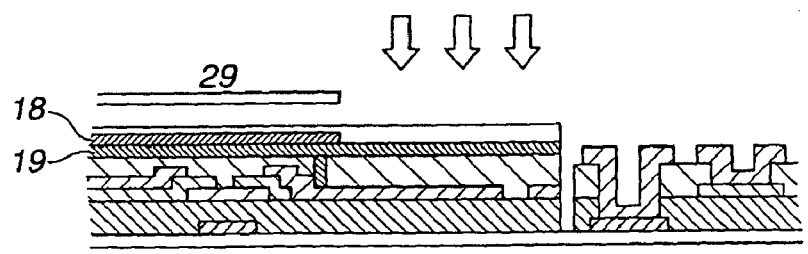

Referring to FIG. 2(e), a polyimide material containing long-alkyl side chain is coated onto the reflective electrode 18 and transmissive electrode 19 and dried by heating to form a polyimide alignment film. The presence of long-alkyl side chain is known to induce a pretilt angle of LC almost as large as 90 degrees. Using a mask 29 to cover the alignment film overlying the reflective electrode 18, an ultraviolet (UV) light is applied to the alignment film as indicated by arrows. Due to exposure to the UV light, separation of long-alkyl side chain takes place within the unmasked portion overlying the transmissive electrode 19, resulting in a considerable reduction in pretilt angle in the LC.

Figure 2F:
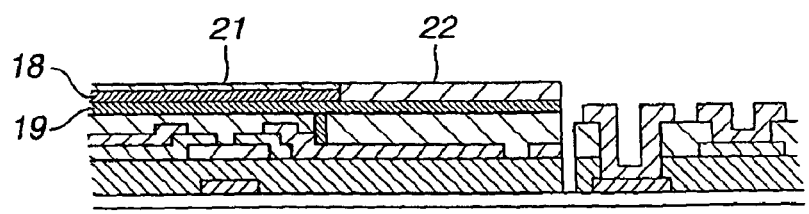

Referring to FIG. 2(f), after exposure to UV light, the mask 29 is removed, and the polyimide alignment film is rubbed in a direction for the LC molecules to align. That portion of the polyimide alignment film that coats the reflective electrode 18 becomes a vertical alignment film 21 because it was not exposed to the UV light. The remaining portion of the polyimide alignment film that coats the transmissive electrode 19 becomes a horizontal alignment film 22. In the implementation, the rubbing treatment follows the exposure to UV light. The same result occurs by exposing the polyimide alignment film to UV light after rubbing treatment. This is because the separation of long-alkyl side chain takes place by the UV light exposure treatment in the same manner before or after the rubbing treatment.

The polyimide material coated on the counter substrate 12 becomes a horizontal alignment film 22 due to the exposure to UV light and the rubbing treatment. As a result, as shown in FIG. 3, the mode of alignment of LC molecules within the reflective mode region including the reflective electrode 18 becomes a HAN alignment mode, and the mode of alignment of LC molecules within the transmissive mode region including the exposed transmissive electrode 19 becomes a homogeneous alignment mode or a TN alignment mode.

Different orientations of alignment of the LC molecules provide different reflective indexes. The fabrication process described in connection with FIGS. 2(a) to 2(f) has provided different modes of alignment of LC molecules in the reflective mode region above the reflective electrode 18 and in the transmissive mode region above the transmissive electrode 19. Using different indexes of refraction provided by different modes of alignment of LC molecules, different values in retardation ($\Delta n \times d$) are provided in the reflective mode region and in the transmissive mode region. Thus, with the same thickness of the LC cell, sufficiently high brightness is provided in the reflective mode as well as in the transmissive mode.

In the present application, the expression that "a difference in mode of alignment of LC molecules" is intended to mean a difference in twist angle of the same alignment mode, for example, TN mode, which causes a difference in retardation. Such difference in twist angle of the same alignment mode can be obtained by rubbing the counter substrate in one direction and subjecting the alignment film of the lower side or TFT substrate to optimal treatment. First step of the treatment is to expose the alignment film on the TFT substrate to liner polarized light such that the twist angle of LC molecules as much as about 70 degrees takes place. This step is followed by a second step of exposing the laminated film, with its reflective region masked, to linear polarized light such that the twist angle of about zero degree takes place in the unmasked transmissive region. In this manner, the twist angle of LC molecules becomes about 70 degrees in the reflective region, and the twist angle of the LC molecules in the transmissive region becomes about zero degree. In this manner, a difference in retardation between the reflective region and the transmissive region is accomplished, Second Implementation of the Invention With reference to FIGS. 4 to 5(f), the second implementation of a transflective LCD device of the invention is described. The second implementation is substantially the same as the first implementation except the provision of a color filter 30 instead of the insulating layer 17.

Figure 4:
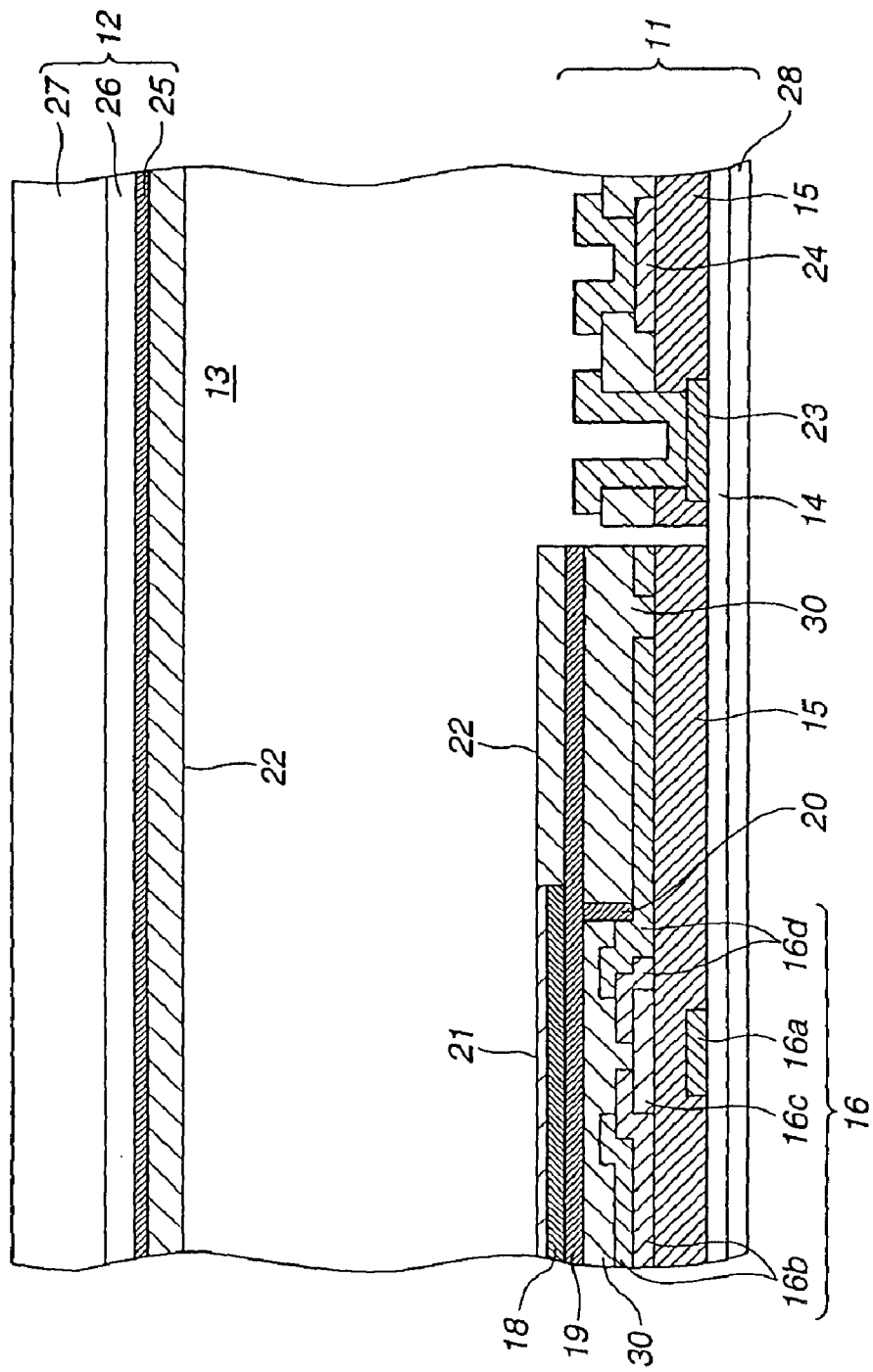
FIG. 4 is a sectional view of one pixel portion of a transflective LCD device, illustrating a second exemplary implementation of the present invention.

FIG. 4 is the same view as FIG. 1, illustrating that a lower side substrate 11 includes the color filter 30 instead of the insulating layer 17. The color filter 30 covers a TFT 16 and it is formed with a contact hole 20 exposing a surface portion of a source electrode 16d.

With reference to the fabrication steps illustrated in FIGS. 5(a) to 5(f), the second implementation of the invention is further described. The fabrication steps illustrated in FIGS. 5(a) to 5(f) are substantially the same as those illustrated in FIGS. 2(a) to 2(f), respectively.

Figure 5A:
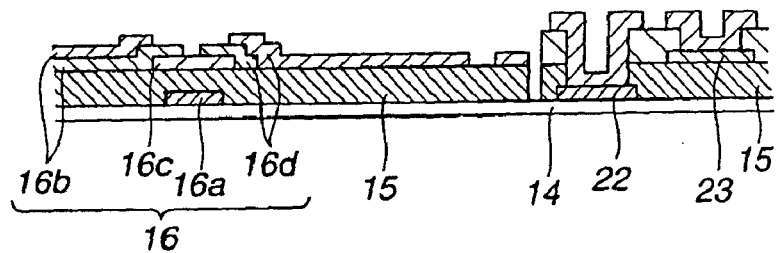
FIGS. 5(a) to 5(f) are views illustrating fabrication steps for the second implementation.
Figure 5B:
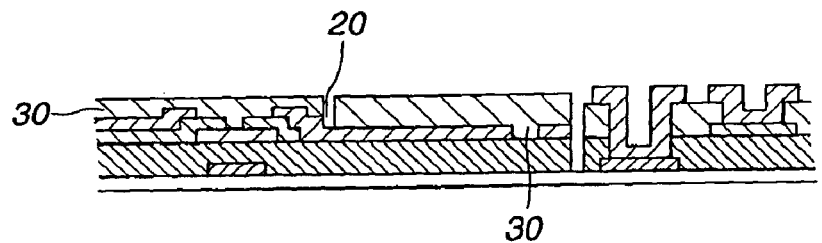
Figure 5C:
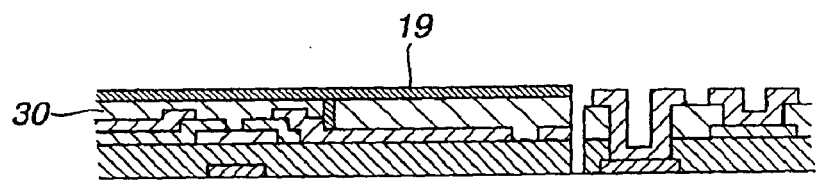
Figure 5D:
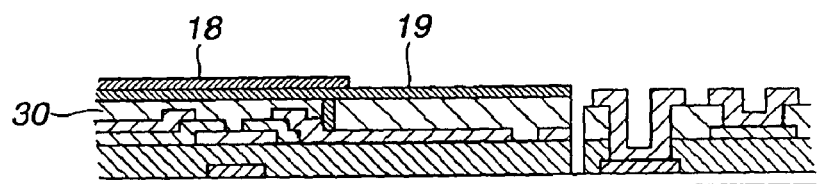

Referring to FIG. 5(b), the TFT 16 is covered with a color filter 30. The color filter 30 is formed with a contact hole 20 reaching the underlying source electrode 16d. The color filter 30 is fabricated by color-resist method. In the color-resist method, a photolithography technique is used to form the color patterns. The color-resist is made by diffusing pigment (red or green or blue or black) in a photosensitive acrylic polymer resin.

The second implementation is different in optical path from the first implementation. In the second implementation, in the transmissive mode, light from a backlight 28 passes through the color filter 30 of the under side or TFT substrate 11 before passing through a color filter 26 of a counter substrate 12. In the reflective mode, the incident light to the counter substrate 12 passes through the color filter 26, and the reflected return light passes again through the color filter 26. In each of the modes, light passes through one color filter and then through the same or another color filter, making color correction easy for eliminating a difference in color expression between the two modes or for independent color correction in each of the modes.

Third Implementation of the Invention

Figure 6:
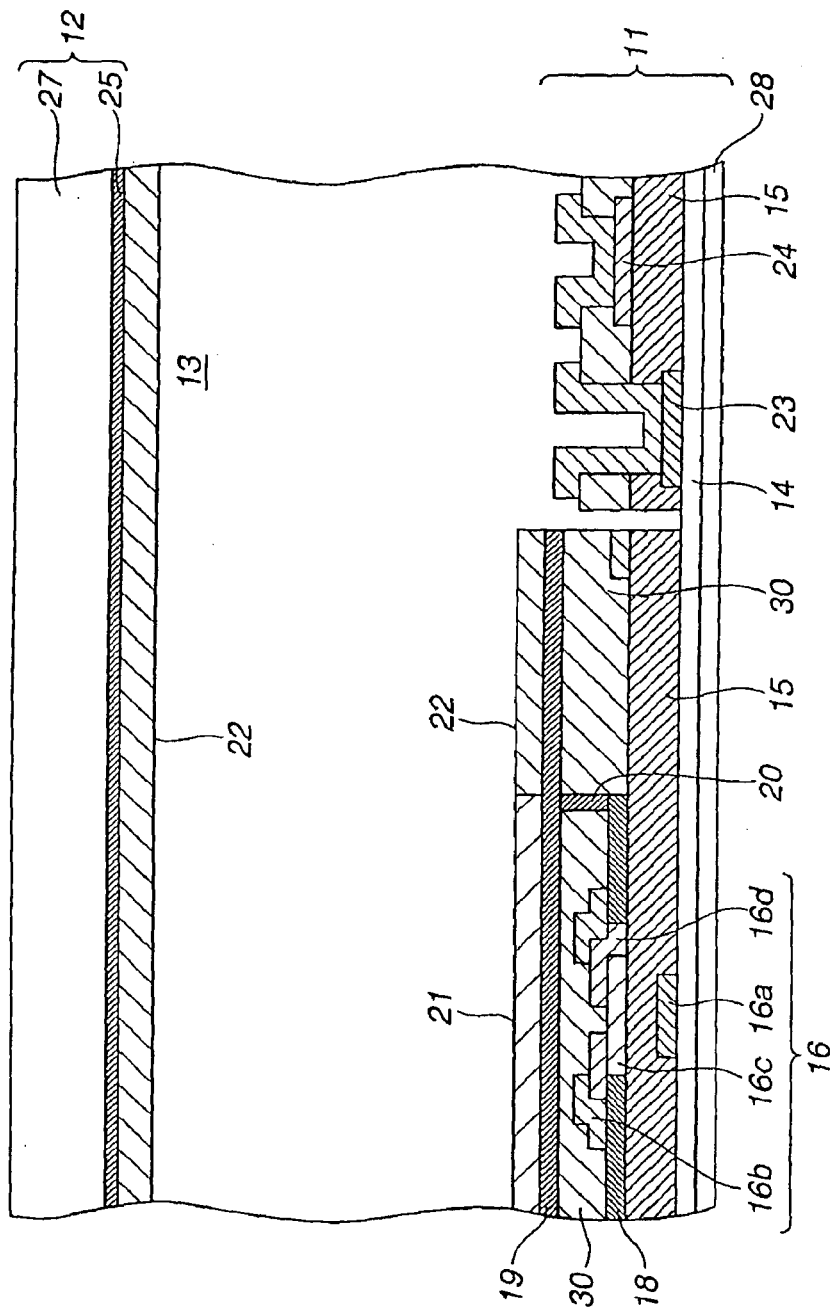
FIG. 6 is a sectional view of one pixel portion of a transflective LCD device, illustrating a third exemplary implementation of the present invention.
Figure 7A:
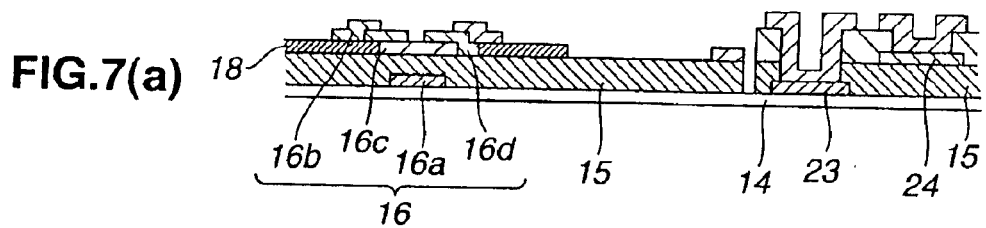
FIGS. 7(a) to 7(e) are views fabrication steps for the third implementation.
Figure 7B:
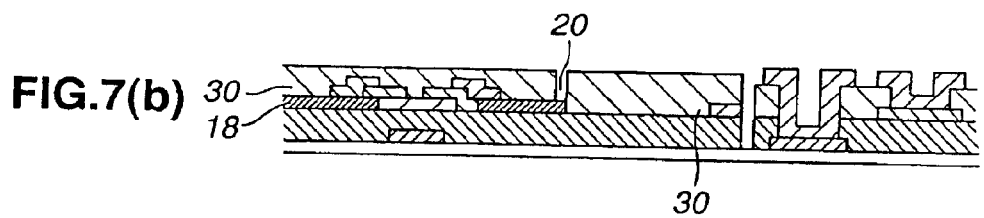
Figure 7C:
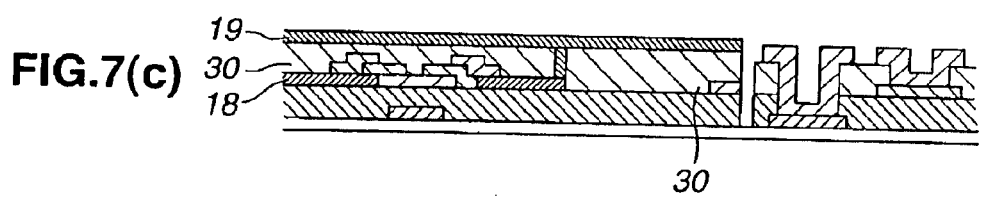
Figure 7D:
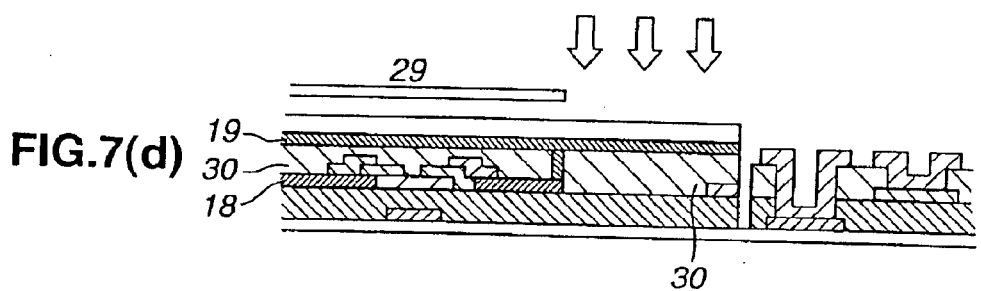
Figure 7E:
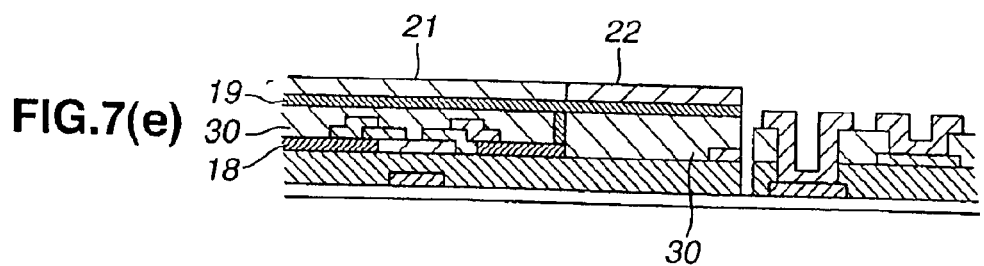

With reference to FIGS. 6 to 7(e), the third implementation of a transflective LCD device of the invention is described. The third implementation is similar to the second implementation in that a color filter 30 is used instead of the insulating layer 17 used in the first implementation. Comparing FIG. 6 to FIG. 4 clearly reveals that, in the third implementation, a counter substrate 12 does not have a color filter, and a lower side or TFT substrate 11 has a reflective electrode 18 formed on the surface of a protective insulating film 15. The reflective electrode 18 is in contact with a source electrode 16d of a TFT 16 and connected to a transmissive electrode 19 via a contact hole 20 formed through the color filter 30. The color filter 30 underlying the transmissive electrode 19. As readily seen from FIG. 6, the thickness of the color filter 30 overlying the reflective electrode 18 in the reflective region is less than the thickness of the color filter 30 in the transmissive region. This difference in the thickness of color filter 30 can be adjusted by altering the thickness of the reflective electrode 18.

The third implementation is different in optical path from the second implementation. In the third implementation, in the transmissive mode, light from a backlight 28 passes through the color filter 30 of the under side or TFT substrate 11 once. In the reflective mode, the incident light to the counter substrate 12 passes through the color filter 30, and the reflected return light passes again through the color filter 30. As mentioned above, altering the thickness of the reflective electrode 18 can provide a desired difference in the thickness of color filter 30, making color correction easy for eliminating a difference in color expression between the two modes. Beside, there is no need to provide a color filter in the counter substrate 12, leading to a reduction in fabrication cost. An error inherent with positioning a color filter within the counter substrate no longer exists, providing enhanced display.

With reference to the fabrication steps illustrated in FIGS. 7(a) to 7(e), the third implementation of the invention is further described. FIGS. 7(a) to 7(c) are substantially the same as FIGS. 5(a) to 5(c), respectively, except the formation of the reflective electrode 18 in FIG. 7(a) in the third implementation. In the second implementation, the reflective electrode 18 is formed on the transmissive electrode 19 in FIG. 5(d). Accordingly, this implementation does not have a fabrication step corresponding to the fabrication step illustrated in FIG. 5(d). FIGS. 7(d) and 7(e) are substantially the same as FIGS. 5(e) and 58f), respectively.

Referring to FIG. 7(a), a gate electrode 16a is formed on an insulating substrate 14. The gate electrode 16a and the insulating substrate 14 are coated with a protective insulating film 15. A reflective electrode 18 is formed on the on the protective film 15 in contact with a source electrode 16d. Forming a drain electrode 16b and a semiconductor layer 16c completes a TFT 16.

Referring to FIG. 7(b), the TFT 16 and reflective electrode 18 are covered with a color filter 30. The color filter 30 is formed with a contact hole 20 reaching the underlying reflective electrode 18.

Referring to FIG. 7(c), a transmissive electrode 19 of ITO is formed over the color filter 30. The material of the transmissive electrode 19 fills the contact hole 20 to establish electrical connection between the transmissive electrode 19 and the reflective electrode 18.

Figure 5E:
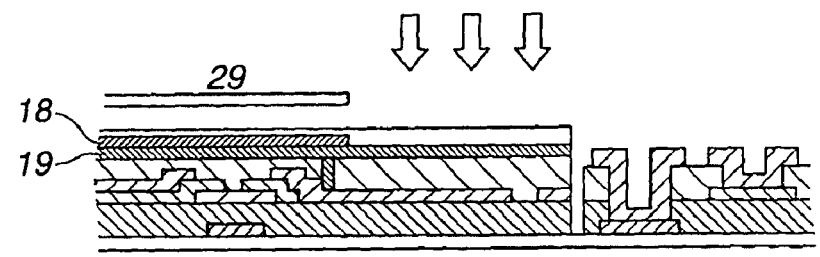
Figure 5F:
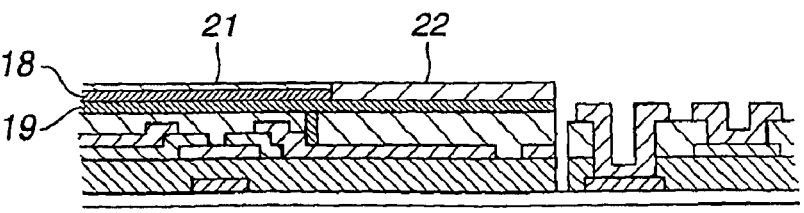

The fabrication steps of FIGS. 7(d) and 7(e) are substantially the same as the fabrication steps of FIGS. 5(e) and 5(f), which in turn are substantially the same as the fabrication steps of FIGS. 2(e) and 2(f). Accordingly, a description on FIGS. 7(d) and 7(e) is hereby omitted for brevity, Fourth Implementation of the Invention With reference to FIG. 8, the fourth implementation of a transflective LCD device of the invention is described. This implementation is applicable to any one of the first, second and third implementations if the mode of a LC layer 13 is of the TN type. According to the fourth implementation, a lower side substrate 11 includes a polarizer 31 and a quarter-wave plate 32, and a counter substrate 12 includes another polarizer 31 and another quarter-wave plate 32.

Figure 8:
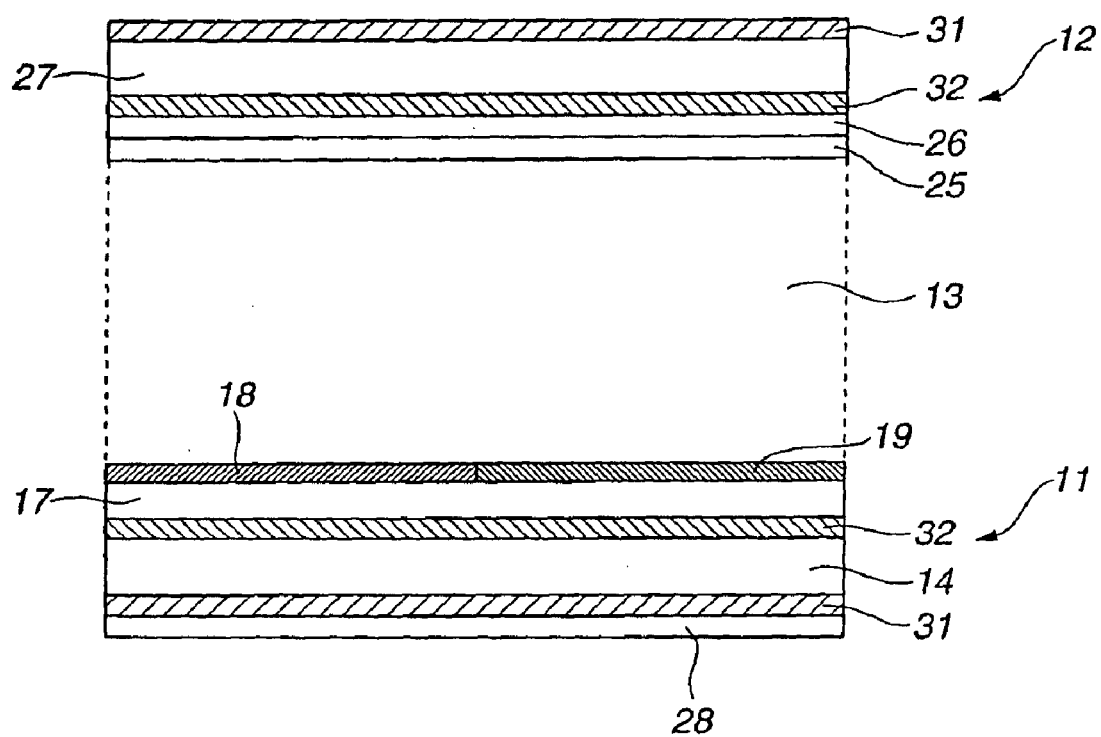
FIG. 8 is a very simplified view of one pixel portion of a transflective LCD device, illustrating a fourth exemplary implementation of the present invention.

In the lower side substrate 11 shown in FIG. 8, the polarizer 31 is positioned between an insulating substrate 14 and a backlight 28. The quarter-wave plate 32 is positioned between the insulating substrate 14 and an insulating layer 17 (or a color filter 30, see FIGS. 4 and 6). In the counter substrate 12 shown in FIG. 8, the quarter-wave plate 32 is positioned on the nearest side of an insulating substrate 27 to the LC layer 13. The polarizer 31 is positioned on the remote side of the insulating substrate 24 from the LC layer 13.

The polarizers 31 are oriented orthogonally to each other. Each of the polarizers 31 has a transmission axis. In the lower side substrate 11, the fast and slow axes of the quarter-wave plate 32 should each be oriented at an angle of substantially 45 degrees relative to the orientation of the transmission axis of the polarizer 31. In the counter substrate 12, the fast and slow axes of the quarter-wave plate 32 should each be oriented at an angle of substantially 45 degrees relative to the orientation of the transmission axis of the polarizer 31.

In the reflective mode, when the LC layer 13 is twisted, the polarizer 31 of the counter substrate 12 receives ambient light and linearly polarizes the light. The quarter-wave plate 32 converts the linearly polarized light into right handed circularly polarized light. The twisted LC layer 13 converts the right handed circularly polarized light into linearly polarized light. At the reflective electrode 18, the linearly polarized light is reflected and returns to the twisted LC layer 13. The twisted LC layer 13 converts the linearly polarized return light to right handed circularly polarized return light. The quarter-wave plate 32 of the counter substrate 12 converts the right handed circularly polarized return light to linearly polarized return light. The linearly polarized return light passes through the polarizer 31 of the counter substrate 12 to a viewer.

In the reflective mode, when the LC layer 13 is vertically aligned, the polarizer 31 of the counter substrate 12 receives ambient light and linearly polarizes the light. The quarter-wave plate 32 converts the linearly polarized light into right handed circularly polarized light. The right handed circularly polarized light passes through the vertically aligned LC layer 13, is reflected at the reflective electrode 18 to become left handed circularly polarized return light. The left handed circularly polarized return light passes through the vertically aligned LC layer 13. The quarter-wave plate 32 of the counter substrate 12 converts the left handed circularly polarized return light to linearly polarized return light. This linearly polarized return light cannot pass through the polarizer 31 of the counter substrate 12.

In the transmissive mode, when the LC layer 13 is twisted, the polarizer 31 of the lower side substrate 11 receives light from the backlight 28 and linearly polarizes the light. The quarter-wave plate 32 converts the linearly polarized light into left handed circularly polarized light. The twisted LC layer 13 converts the left handed circularly polarized light into right handed circularly polarized light. The quarter-wave plate 32 of the counter substrate 12 converts the right handed circularly polarized light to linearly polarized light. The linearly polarized light passes through the polarizer 31 of the counter substrate 12 to the viewer.

In the transmissive mode, when the LC layer 13 is vertically aligned, the polarizer 31 of the lower side substrate 11 receives light from the backlight 28 and linearly polarizes the light. The quarter-wave plate 32 converts the linearly polarized light into left handed circularly polarized light. The left handed circularly polarized light passes through the vertically aligned LC layer 13. The quarter-wave plate 32 of the counter substrate 12 converts the left handed circularly polarized light to linearly polarized light. This linearly polarized light cannot pass through the polarizer 31 of the counter substrate 12.

As shown in FIG. 8, the fourth implementation has inside quarter-wave plates 32, which are protected against UV radiation and humidity by the insulating substrates 14 and 27 and the polarizers 31.

In the fourth implementation, the quarter-wave plates 32 are separated from the respective polarizers 31 and positioned on the near sides of the insulating substrates 14 and 27 to the LC layer 13. This arrangement no longer requires adhesive that was used between the polarizer and the quarter-wave plate, providing greater freedom in selecting an appropriate material of the quarter-wave plate.

The quarter-wave plate is formed of material exhibiting liquid crystal property, which will induce alignment of LCs. Thus, if the quarter-wave plates are positioned in place of alignment films, the provision of alignment films and rubbing treatment may be eliminated. In the case LC cells are in the form of 90 degrees twist structure, it is no longer needed to subject the underside and counter substrates to alignment treatment. In the case LC cells are of the HAN type, the rubbing treatment may be eliminated.

It is possible to arrange quarter-wave plates in a manner to interpose LC cells. This arrangement is effective in preventing light from the adjacent pixels to pass through the relatively thin insulating substrates, each having 500 to 700 $\mu$m thick.

FIGS. 9(a) to 9(i) are oversimplified views illustrating other possible arrangements of polarizers 31 and quarter-wave plates 32.

Fifth Implementation of the Invention

Figure 10:
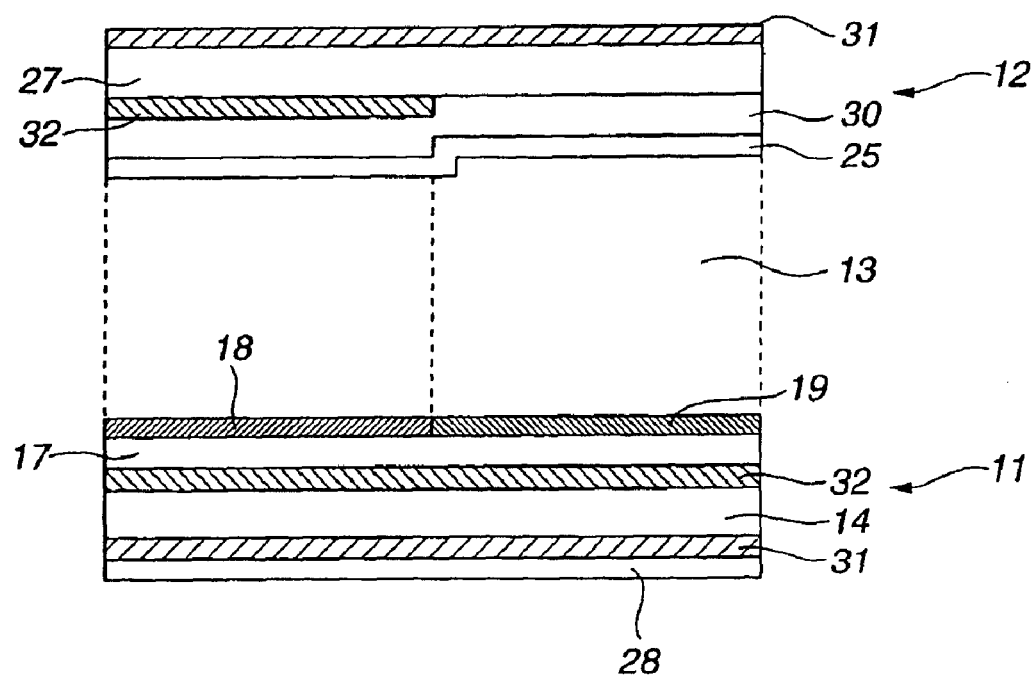
FIG. 10 is a very simplified view of one pixel portion of a transflective LCD device, illustrating a fifth exemplary implementation of the present invention.

With reference to FIG. 10, the fifth implementation of a transflective LCD device of the invention is described. This implementation is applicable to any one of the first, second and third implementations if the mode of a LC layer 13 is of the TN type. According to the fifth implementation, a lower side substrate 11 includes a polarizer 31 and a quarter-wave plate 32, and a counter substrate 12 includes another polarizer 31 and another quarter-wave plate 32. However, the quarter-wave plate 32 of the counter substrate 12 is not provided in the transmissive region.

In the lower side substrate 11 shown in FIG. 8, the polarizer 31 is positioned between an insulating substrate 14 and a backlight 28. The quarter-wave plate 32 is positioned between the insulating substrate 14 and an insulating layer 17 (or a color filter 30, see FIGS. 4 and 6). In the counter substrate 12 shown in FIG. 8, the quarter-wave plate 32 is positioned on the nearest side of an insulating substrate 27 to the LC layer 13. The polarizer 31 is positioned on the remote side of the insulating substrate 24 from the LC layer 13.

A photoresist and etching technique is used to remove the portion of the quarter-wave plate 32 of the counter substrate 12 to form an opening in the transmissive region.

The following two paragraphs provide a description on the relationship between the strength of output light and quarter-wave plate in the transmissive mode.

In the transmissive mode, light from a backlight 28 passes through the polarizer 31 and quarter-wave plate 32 of the lower side substrate 11 to a LC layer 13. After passing through the LC layer 13, light passes through the quarter-wave plate 32 and the polarizer 31 of the counter electrode 12. The strength of output light $I_\lambda$ is expressed as, $$I_\lambda = (\tfrac{1}{2})[(\Gamma/2) \times (1/X) \times \sin X]^2 \qquad \text{Eq. 1}$$

where, $\lambda$=Wavelength of light ($\Delta n \times d$)=Retardation of LC layer 13

$\phi$=Twist angle of LC molecules $\Gamma = 2\pi(\Delta n \times d)/\lambda$ $X = [\phi^2 + (\Gamma/2)^2]^{1/2}$ In the transmissive mode, light from the backlight passes through the polarizer 31 of the underside substrate 11 to the LC layer 13, and after passing through the LC layer 13, light passes through the polarizer 31 of the counter substrate 12. In this case, the light does not pass any one of the quarter-wave plates 32. The strength of output light $I_p$ is expressed as, $$I_p = (\tfrac{1}{2})[(1/X) \times \sin X]^2 [\phi^2 \times \cos^2 \phi + \sin^2 \phi \times (\Gamma/2)^2] + \sin^2 \phi \cos^2 X - \phi \sin 2\phi \cos X [(1/X) \times \sin X] \qquad \text{Eq. 2}$$

Figure 11:
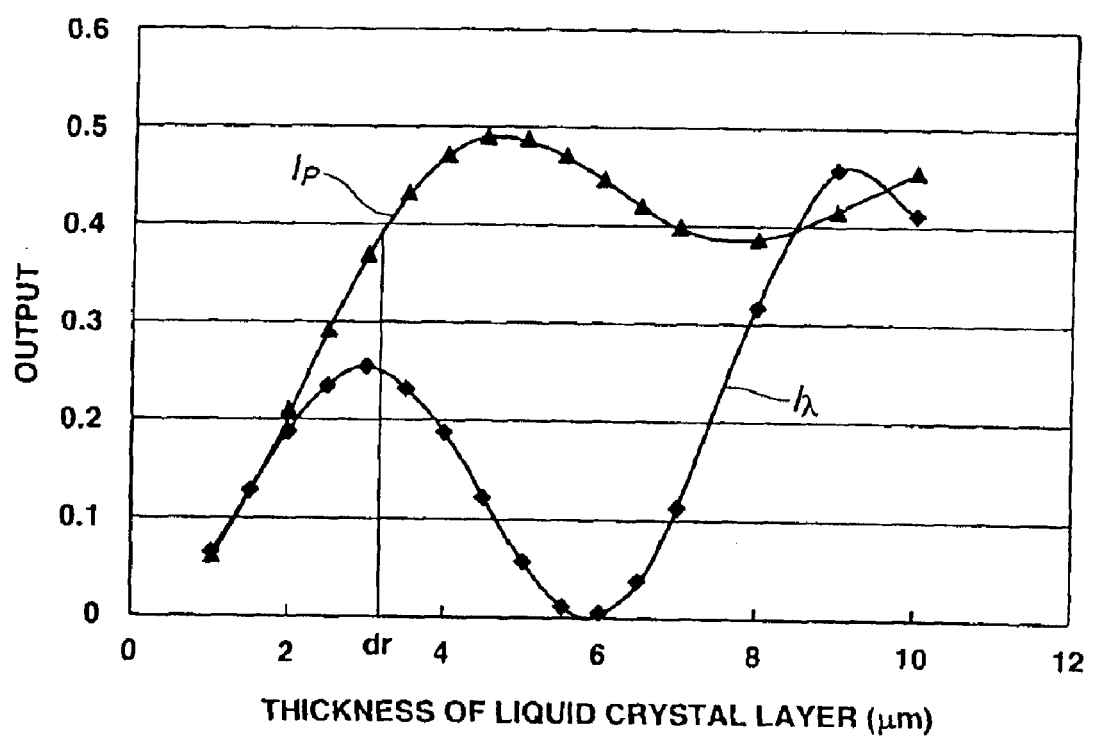
FIG. 11 is a graphical representation of varying of the strength of output light $I_\lambda$ versus different values of thickness of LC layer, and varying of the strength of output light $I_p$ versus different values of thickness of the LC layer.

FIG. 11 provides a curve interconnecting the plotted values of $I_\lambda$ calculated for different values of thickness of LC layer, and another curve interconnecting the plotted values of $I_p$ calculated for different values of thickness of the LC layer. In the reflective mode, the thickness dr of the LC layer when the strength of output light is the maximum is about 3 $\mu$m. When a LCD device is designed with the thickness of LC layer around 3 $\mu$m, the strength of output light $I_p$ exceeds the strength of output light $I_\lambda$.

Apparently, the above consideration suggests that, in the fifth implementation of FIG. 10, removing the quarter-wave plate 32 of the lower side substrate 11 will increase the strength of output light in transmissive mode as well as in the reflective mode.

Sixth Implementation of the Invention

Figure 12A:
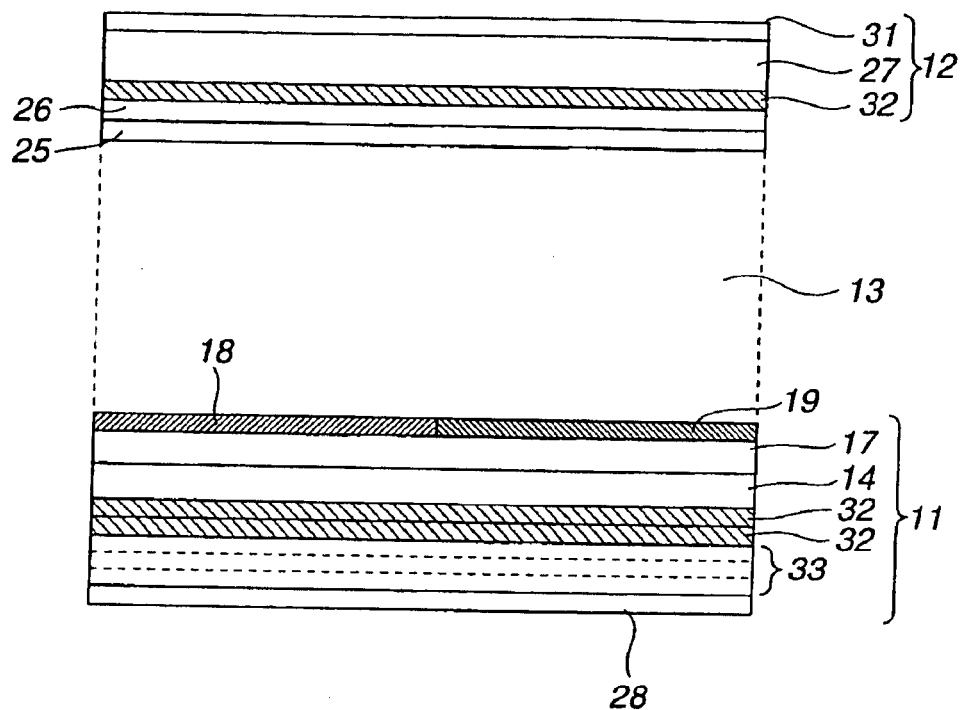
FIGS. 12(a) and 12(b) are very simplified views of one pixel portion of a transflective LCD device, illustrating two embodiments of a sixth exemplary implementation of the present invention.
Figure 12B:
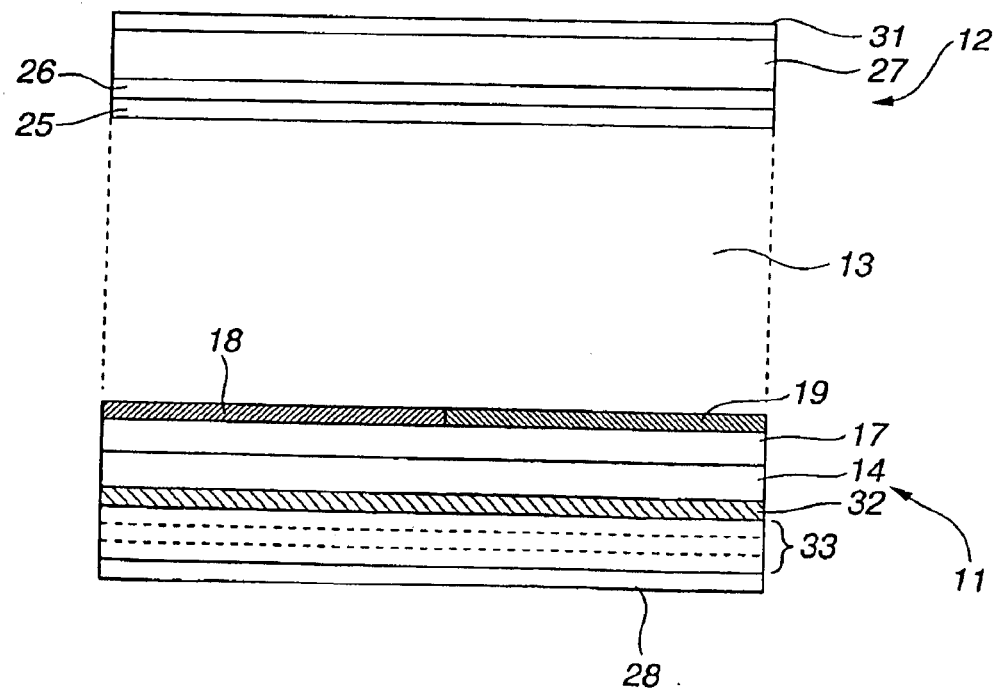

With reference to FIGS. 12(a) and 12(b), the sixth implementation of a transflective LCD device of the invention is described. This implementation features the provision of three layer filter/reflector 33 of cholesteric liquid crystal (CLC) layers which reflect left or right handed circularly polarized blue, green and red light.

The three-layer filter/reflector 33 is positioned between an insulating substrate 14 of a lower side substrate 11 and a backlight 28. In a counter substrate 12, a quarter-wave plate 32 is positioned on the near side of an insulating substrate 27 to a LC layer 13.

In the sixth implementation, the three-layer filter/reflector 33 of CLC layers have replaced a quarter-wave plate and a polarizer in the lower side substrate 11. In the transmissive mode, the reflected circularly polarized light passes to the viewer. To prevent this, two quarter-wave plates 32 are positioned on the near side of the three-layer filter/reflector 33 of CLC layers to the LC layer 13 as illustrated in FIG. 12(a). As illustrated in FIG. 12(b), a single quarter-wave plate 32 may be positioned on the near side of the three-layer filter/reflector 33 of CLC layers to the LC layer 13. In this case, a quarter-wave plate may be removed from counter substrate 12.

Seventh Implementation of the Invention

Figure 13:
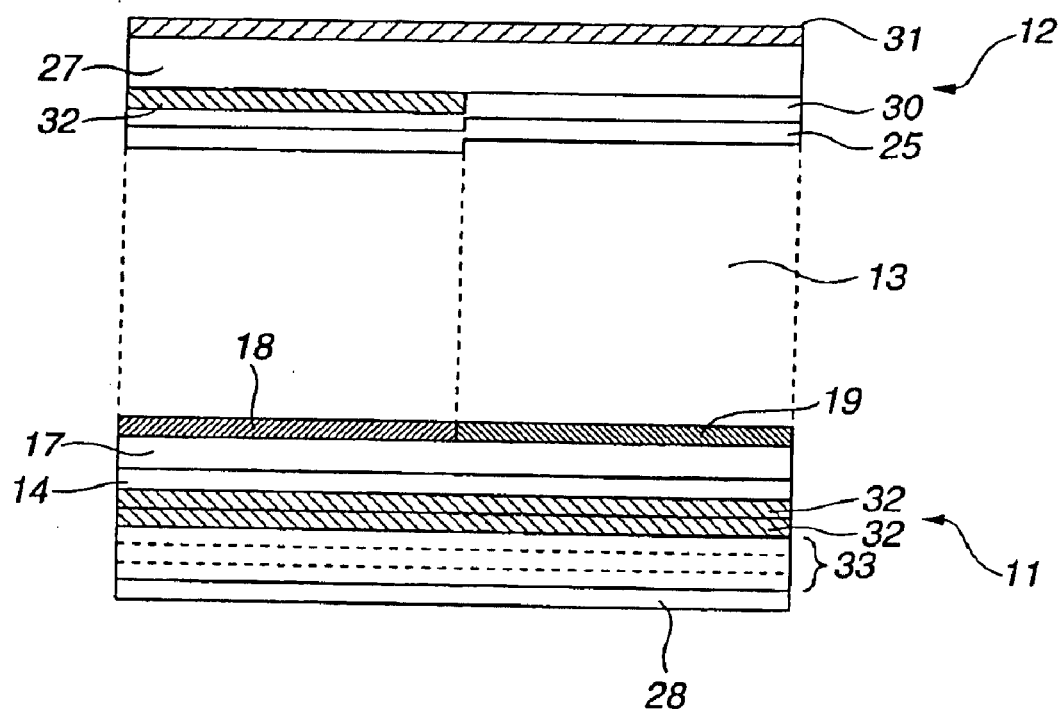
FIG. 13 is a very simplified view of one pixel portion of a transflective LCD device, illustrating a seventh exemplary implementation of the present invention.
Figure 14:
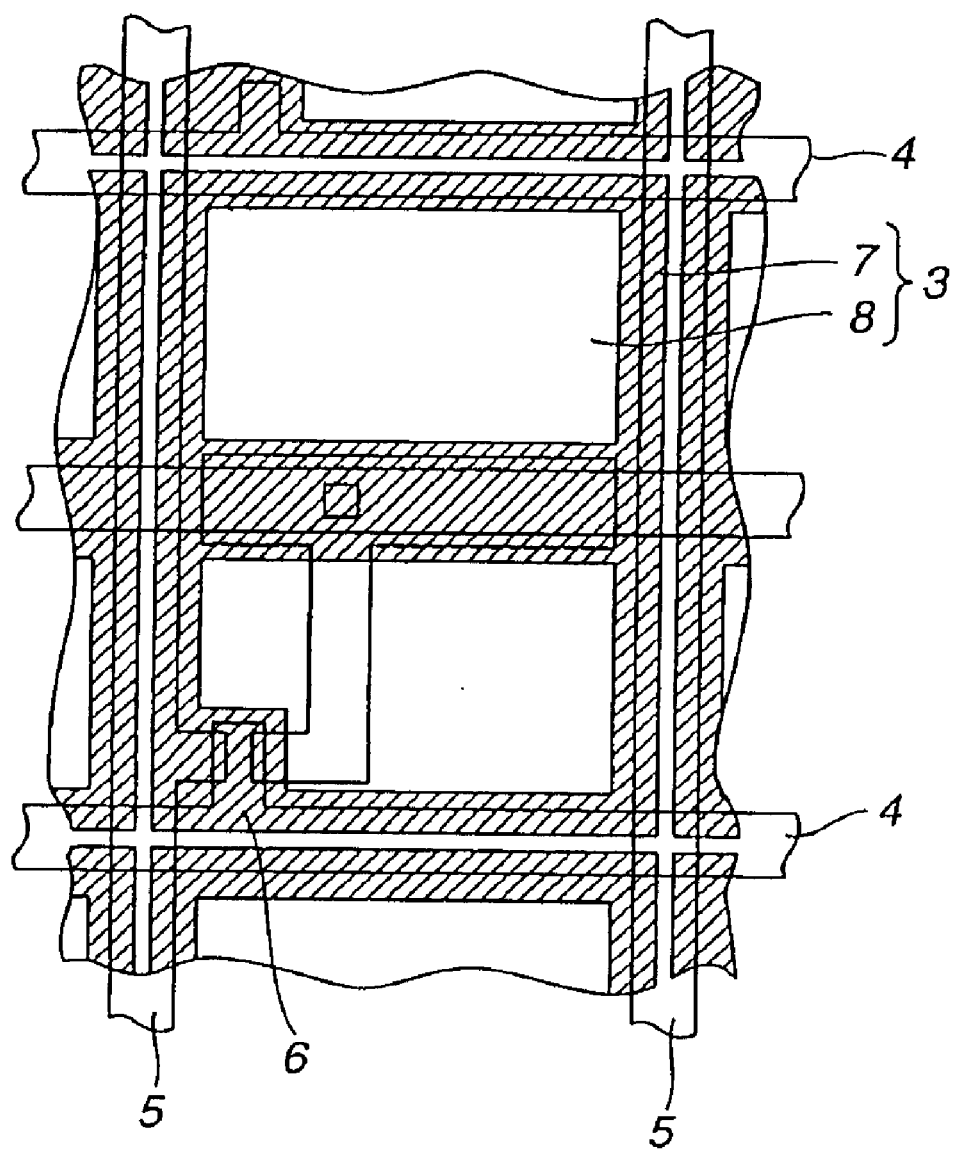
FIGS. 14 and 15 are views illustrating the discussed prior art.
Figure 15:
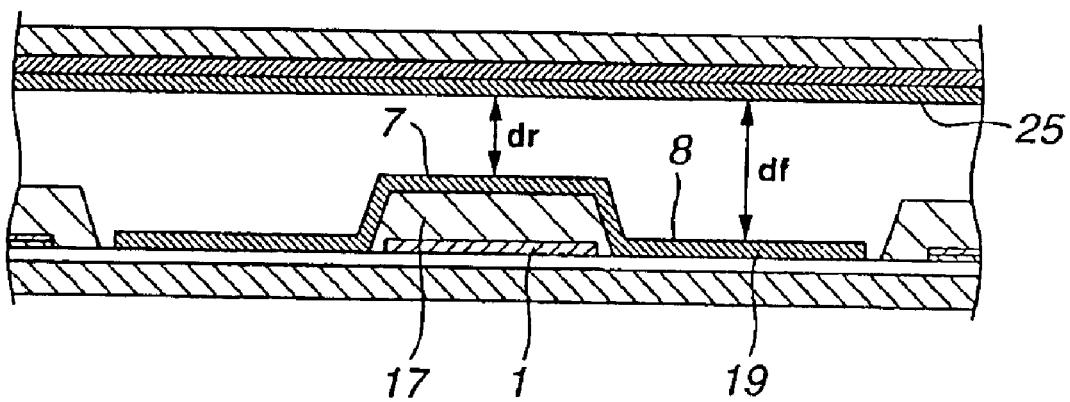

With reference to FIG. 13, the seventh implementation of a transflective LCD device of the invention is described. This implementation features the provision of two quarter-wave plates 32 and three-layer filter/reflector 33 of CLC layers, and the elimination of a quarter-wave 32 of a counter substrate 12 in the transmissive region.

The three-layer filter/reflector 33 is positioned between an insulating substrate 14 of a lower side substrate 11 and a backlight 28. The quarter-wave plate 32 is positioned between an insulating substrate 14 and the three-layer filter/reflector 33. In a counter substrate 12, a quarter-wave plate 32 is positioned on the near side of an insulating substrate 27 to a LC layer 13.

A photoresist and etching technique is used to remove the portion of the quarter-wave plate 32 of the counter substrate 12 to form an opening in the transmissive region.

While the present invention has been particularly described, in conjunction with exemplary implementations, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

This application claims the priority of Japanese Patent Application No. P2001-251089, filed Aug. 22, 2001, the disclosure of which is hereby incorporated by reference in its entirety.

What is claimed is:

1. A liquid crystal display device, comprising:
a first substrate comprising a thin film transistor;
a second substrate; and
a liquid crystal layer of liquid crystal molecules, the liquid crystal layer being interposed by the first and second substrates;
the first substrate comprising a reflective electrode in a reflective region and a transmissive electrode in a transmissive region,
the liquid crystal layer comprising a first group of liquid crystal molecules aligned in the reflective region to provide a first refractive index and a second group of liquid crystal molecules aligned in the transmissive region to provide a second refractive index that is different from the first refractive index.

2. The liquid crystal display device of claim 1, wherein the first substrate further comprises an insulating layer over the thin film transistor, and the reflective electrode is over the insulating layer, and wherein the second substrate comprises a color filter.

3. The liquid crystal display device of claim 1, wherein the first substrate further comprises a color filter over the reflective electrode and the thin film transistor, the color filter having a first thickness in the reflective region and a second thickness in the transmissive region, the first thickness being less than the first thickness.

4. The liquid crystal display device of claim 1, wherein the first substrate further comprises a color filter over the thin film transistor, and the reflective electrode is on the color filter, and wherein the second substrate comprises another color filter.

5. The liquid crystal display device of claim 1, wherein said transmissive electrode is electrically connected to the reflective electrode.

6. The liquid crystal display device of claim 1, wherein the liquid crystal molecules are aligned in at least one mode selected from homogeneous alignment mode, homeotropic alignment mode, twisted nematic alignment mode, hybrid aligned nematic alignment mode, and an optically controlled birefrigence alignment mode.

7. The liquid crystal display device of claim 1, wherein the first group of liquid crystal molecules is aligned in hybrid aligned nematic alignment mode, and the second group of liquid crystal molecules is aligned in one of homogeneous alignment mode and twisted nematic alignment mode.

8. The liquid crystal display device of claim 1, wherein the second substrate comprises a quarter-wave plate.

9. The liquid crystal display device of claim 8, wherein the quarter-wave plate has an opening in the transmissive region.

10. The liquid crystal display device of claim 8, wherein the first substrate comprises a second quarter-wave plate.

11. The liquid crystal display device of claim 8, further comprising a cholesteric liquid crystal layer on the remote side of the second substrate from the liquid crystal layer.

12. The liquid crystal display device of claim 9, further comprising a cholesteric liquid crystal layer on the remote side of the second substrate from the liquid crystal layer, and a second quarter-wave plate between the cholesteric liquid crystal layer and the first substrate.

13. A liquid crystal display, comprising:
a first substrate;
a second substrate; and
a liquid crystal molecule layer between the first and second substrates,
wherein the first substrate comprises reflective electrode in a reflective region and a transmissive electrode in a transmissive region, and
wherein the liquid crystal molecule layer comprises:
a first group of liquid crystal molecules having a first alignment in the reflective region; and
a second group of liquid crystal molecules having a second alignment in the transmissive region that is different from the first alignment.

14. The display of claim 13, wherein said first substrate further comprises a vertical alignment film in said reflective region.

15. The display of claim 13, wherein said first group of liquid crystal molecules is in a hybrid aligned nematic alignment mode.

16. The display of claim 13, wherein said first substrate further comprises a horizontal alignment film in said transmissive region.

17. The display of claim 13, wherein said second group of liquid crystal molecules is in one of a homogeneous alignment mode and a twisted-nematic alignment mode.

18. A liquid crystal display, comprising:
a first substrate;
a second substrate; and
a liquid crystal molecule layer between the first and second substrates,
wherein the liquid crystal molecule layer comprises:
a first group of liquid crystal molecules in a reflective region having a first refractive index; and
a second group of liquid crystal molecules in a transmissive region having a second refractive index that is different from the first refractive index.

19. The display of claim 18, wherein said first group of liquid crystal molecules has a first alignment and said second group of liquid crystal molecules has a second alignment.

20. The display of claim 18, wherein said first substrate further comprises a first alignment film in said reflective region and a second alignment film in said transmissive region, wherein said first alignment film has an alignment that is different than said second alignment.

21. A method of manufacturing a liquid crystal display, comprising:
providing a first group of liquid crystal molecules in a reflective region having a first alignment layer to provide a first refractive index; and
providing a second group of liquid crystal molecules in a transmissive region having a second alignment layer to provide a second refractive index that is different from the first refractive index.

* * * * *

UNITED STATES PATENT AND TRADEMARK OFFICE
CERTIFICATE OF CORRECTION

PATENT NO. : 6,862,058 B2
DATED : August 21, 2002
INVENTOR(S) : Ikeno et al.

It is certified that error appears in the above-identified patent and that said Letters Patent is hereby corrected as shown below:

<u>Column 4,</u>
Line 23, insert:
-- While the above exemplary implementation describes modes of alignment, a liquid crystal display device in accordance with the present invention may, without limitation, include liquid crystal molecules that are aligned in a least one mode selected from a homogeneous alignment mode, a homeotropic alignment mode, a twisted-nematic alignment mode, a hybrid aligned nematic alignment mode, and an optically controlled birefrigence alignment mode. --.

Signed and Sealed this

Twenty-seventh Day of September, 2005

JON W. DUDAS
*Director of the United States Patent and Trademark Office*